United States Patent
Rong et al.

(10) Patent No.: US 10,028,298 B2
(45) Date of Patent: Jul. 17, 2018

(54) SYSTEM AND METHOD FOR INDICATING PERIODIC ALLOCATIONS

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 31 days.

(21) Appl. No.: 15/376,381

(22) Filed: Dec. 12, 2016

(65) Prior Publication Data

US 2017/0208617 A1    Jul. 20, 2017

Related U.S. Application Data

(60) Provisional application No. 62/280,007, filed on Jan. 18, 2016.

(51) Int. Cl.
*H04W 72/12* (2009.01)
*H04W 48/10* (2009.01)
*H04W 84/08* (2009.01)
*H04W 84/12* (2009.01)

(52) U.S. Cl.
CPC ....... *H04W 72/1263* (2013.01); *H04W 48/10* (2013.01); *H04W 84/08* (2013.01); *H04W 84/12* (2013.01)

(58) Field of Classification Search
CPC . H04W 48/10; H04W 72/1263; H04W 84/08; H04W 84/12; H04W 72/12
See application file for complete search history.

(56) References Cited

U.S. PATENT DOCUMENTS

| | | | |
|---|---|---|---|
| 7,508,781 B2 | 3/2009 | Liu et al. | |
| 8,244,265 B2 | 8/2012 | Vukovic et al. | |
| 2004/0190467 A1* | 9/2004 | Liu | H04W 52/0216 370/311 |
| 2009/0137254 A1* | 5/2009 | Vukovic | H04W 72/12 455/452.1 |
| 2017/0135040 A1* | 5/2017 | Park | H04W 52/0225 |

FOREIGN PATENT DOCUMENTS

WO    2015194787 A1    12/2015

* cited by examiner

*Primary Examiner* — Lakeram Jangbahadur
(74) *Attorney, Agent, or Firm* — Futurewei Technologies, Inc.

(57) ABSTRACT

A wireless communications system includes an access point (AP) and at least a station. The AP transmits a periodic scheduling indicator, a compression indicator and scheduling information to a station. The periodic scheduling indicator indicates whether a periodic transmission is scheduled for a station, and wherein the compression indicator indicates whether the scheduling information for the station is compressed scheduling information. The station determines full scheduling information in accordance with the periodic scheduling indicator, the compression indicator and the scheduling information. Then, the station transmits a packet in accordance with the full scheduling information to the AP. Reduction in signaling overhead is achieved.

20 Claims, 11 Drawing Sheets

SYSTEM AND METHOD FOR INDICATING PERIODIC ALLOCATIONS

CROSS-REFERENCE TO RELATED APPLICATION

This application claims the benefit of U.S. Provisional Application No. 62/280,007, filed on Jan. 18, 2016, entitled "System and Method for Indicating Periodic Allocations," which application is hereby incorporated herein by reference.

TECHNICAL FIELD

The present invention relates to digital communications, and, in particular embodiments, to a system and method for indicating periodic allocations.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STAs)) will also increase, especially in urban areas. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

SUMMARY

An embodiment method includes receiving, by a station, a periodic scheduling indicator, receiving, by the station, a compression indicator in accordance with the periodic scheduling indicator, determining, by the station, scheduling information in accordance with the periodic scheduling indicator and the compression indicator, determining, by the station, a location of a resource for transmitting a packet in accordance with the scheduling information, and transmitting, by the station, the packet in accordance with the location of the resource.

In one embodiment, a station receives a periodic scheduling indicator, a compression indicator and scheduling information from an access point (AP), wherein the periodic scheduling indicator indicates whether a periodic transmission is scheduled for the station, and wherein the compression indicator indicates whether the scheduling information for the station is compressed scheduling information. The station determines full scheduling information in accordance with the periodic scheduling indicator, the compression indicator and the scheduling information, and transmits a packet in accordance with the full scheduling information to the AP.

As an aspect of the embodiment, when the compression indicator indicates compressed scheduling information, the station receives the compressed scheduling information in a Per User Information field of a trigger frame associated with the station; and obtains the full scheduling information according to stored full scheduling information and the compressed scheduling information.

As another aspect of the embodiment, the station stores the full scheduling information in the station.

An embodiment method includes transmitting, by an access point, a periodic scheduling indicator, transmitting, by the access point, a compression indicator in accordance with the periodic scheduling indicator, transmitting, by the access point, scheduling information in accordance with the periodic scheduling indicator and the compression indicator, and receiving, by the access point, a packet from a station in accordance with the scheduling information.

In another embodiment, an access point transmits a periodic scheduling indicator, a compression indicator and scheduling information, wherein the periodic scheduling indicator indicates whether a periodic transmission is scheduled for a station, and wherein the compression indicator indicates whether the scheduling information for the station is compressed scheduling information. The access point receives a packet from the station in accordance with the scheduling information, the periodic scheduling indicator, and the compression indicator.

As an aspect of the embodiment, the periodic scheduling indicator is located in a Common Information field of a trigger frame, and wherein the compression indicator is located in a Per User Information field of the trigger frame associated with the station.

As another aspect of the embodiment, the periodic scheduling indicator is located in a first Per User Information field of a trigger frame, and wherein the compression indicator is located in a Per User Information field of the trigger frame associated with the station.

As another aspect of the embodiment, the periodic scheduling indicator and the compression indicator are located in a Per User Information field of a trigger frame associated with the station.

As another aspect of the embodiment, the access point arranges Per User Info fields of a trigger frame comprising full scheduling information together, followed by Per User Info fields of the trigger frame comprising compressed scheduling information.

An embodiment station includes a processor, and a computer readable storage medium storing programming for execution by the processor. The programming including instructions to configure the station to receive a periodic scheduling indicator, receive a compression indicator in accordance with the periodic scheduling indicator, determine scheduling information in accordance with the periodic scheduling indicator and the compression indicator, determine a location of a resource for transmitting a packet in accordance with the scheduling information, and transmit the packet in accordance with the location of the resource.

An embodiment station includes a processor, and a computer readable storage medium storing programming for execution by the processor. The programming including instructions to configure the station to receive a periodic scheduling indicator, a compression indicator and scheduling information from an access point (AP), wherein the periodic scheduling indicator indicates whether a periodic transmission is scheduled for the station, and wherein the compression indicator indicates whether the scheduling information for the station is compressed scheduling information; determine full scheduling information in accordance with the periodic scheduling indicator, the compression indicator and the scheduling information; and transmit a packet in accordance with the full scheduling information to the AP.

An embodiment access point includes a processor, and a computer readable storage medium storing programming for execution by the processor. The programming including instructions to configure the AP to transmit a periodic scheduling indicator, transmit a compression indicator in accordance with the periodic scheduling indicator, transmit scheduling information in accordance with the periodic scheduling indicator and the compression indicator, and receive a packet from a station in accordance with the scheduling information.

An embodiment access point includes a processor, and a computer readable storage medium storing programming for execution by the processor. The programming including instructions to configure the AP to transmit a periodic scheduling indicator, a compression indicator and scheduling information, wherein the periodic scheduling indicator indicates whether a periodic transmission is scheduled for a station, and wherein the compression indicator indicates whether the scheduling information for the station is compressed scheduling information, and receive a packet from a station in accordance with the scheduling information, the periodic scheduling indicator, and the compression indicator.

By transmitting a periodic scheduling indicator, a compression indicator and scheduling information from an access point (AP), the signaling overhead involved in signaling UL transmission is reduced.

A communicating mechanism is used in a station for a wireless communication system. The communicating mechanism includes a receiving element that receives a periodic scheduling indicator, a compression indicator and scheduling information from an access point (AP). The periodic scheduling indicator indicates whether a periodic transmission is scheduled for the station. The compression indicator indicates whether the scheduling information for the station is compressed scheduling information. The communicating mechanism also includes a determining element that determines full scheduling information in accordance with the periodic scheduling indicator, the compression indicator and the scheduling information; and a transmitting element that transmits a packet in accordance with the full scheduling information to the AP.

BRIEF DESCRIPTION OF THE DRAWINGS

For a more complete understanding of the disclosure, and the advantages thereof, reference is now made to the following descriptions taken in conjunction with the accompanying drawing, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
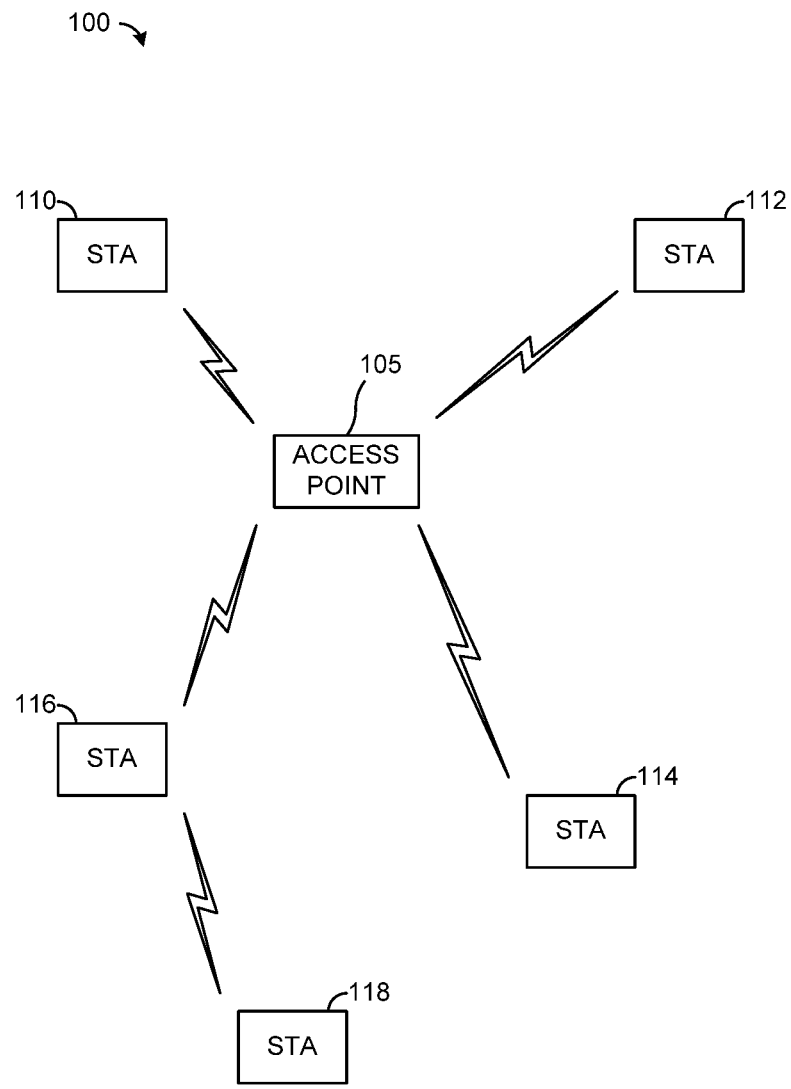
FIG. 1 illustrates an example wireless communications system.

FIG. 1 illustrates an example wireless communications system 100. Wireless communications system 100 includes an access point (AP) 105 that serves one or more stations, such as stations (STA) 110, 112, 114, and 116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
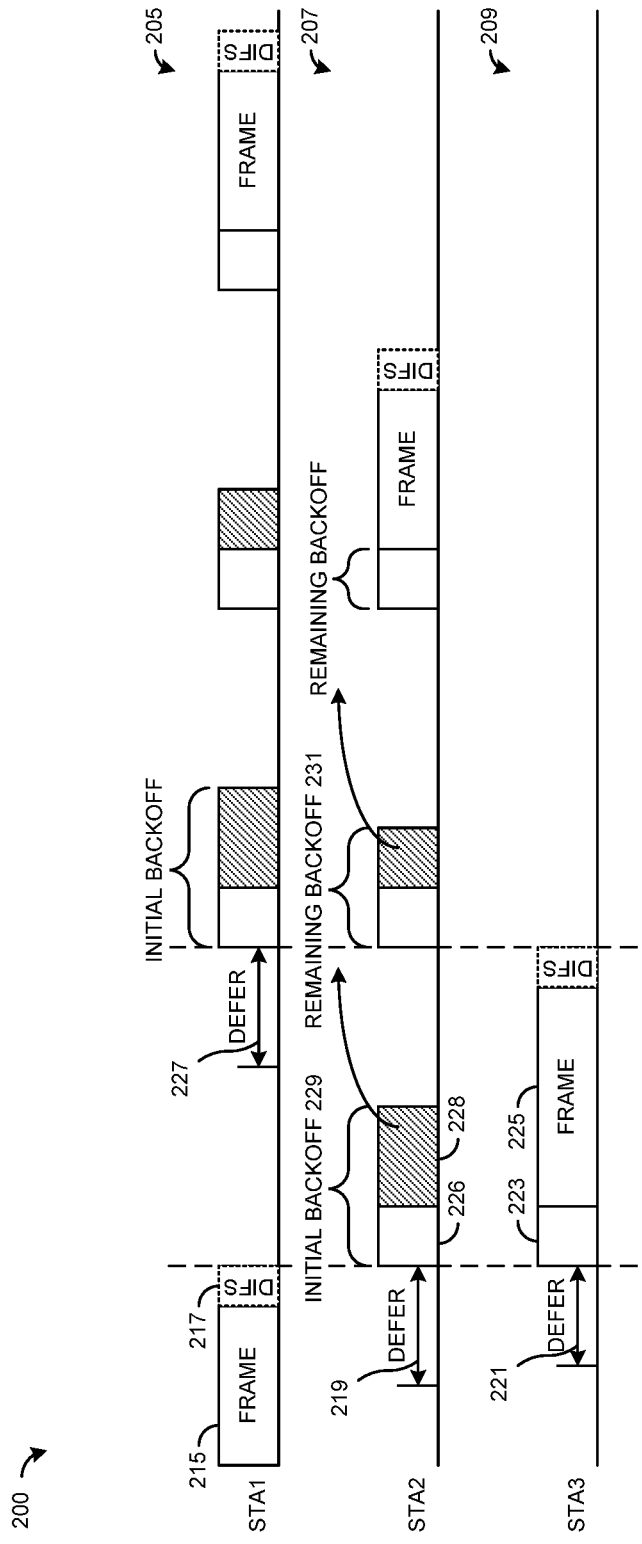
FIG. 2 illustrates a diagram of example channel access timing.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). A short inter-frame space (SIFS) has a duration of 16 microseconds, a point coordination function (PCF) inter-frame space (PIFS) has a duration of 25 microseconds, while a distributed inter-frame space (DIFS) may last longer than either the SIFS or the PIFS. A backoff period may be a random duration. Therefore, active scanning may not provide the best solution when there are large numbers of stations attempting to perform AP/network discovery.

As shown in FIG. 2, STA1 is able to obtain access to the wireless channel and is able to transmit frame 215. While STA1 is transmitting frame 215, both STA2 and STA3 attempt to obtain access to the wireless channel, but since the wireless channel is busy, both defer (defer period 219 and defer period 221 respectively). Both STA2 and STA3 defer until one DIFS period 217 after the end of frame 215. Then STA2 and STA3 begin to contend for access to the wireless channel, by randomly selecting a backoff period to wait. After the random backoff period of a station expires, the station is permitted to contend for access to the wireless channel. As shown in FIG. 2, the random backoff period of STA3 is shorter (shown as period 223) than that of STA 2, STA3 is able to obtain access to the wireless channel and transmits frame 225. During the random backoff period of STA2 (initial backoff 229), STA2 detects that the wireless channel becomes busy so STA2 stops counting down the random backoff period. The time interval between the start of the random backoff period of STA2 until when STA2 stops counting down (interval 226) plus the remaining backoff (interval 228) is referred to as an initial backoff 229. Similarly, while STA3 is transmitting, STA1 detects that the wireless channel is busy and defers (defer period 227) until one DIFS period after the end of frame 225. One DIFS period after the end of frame 225, both STA1 and STA2 begin their backoff, with STA2 continuing its previously stopped random backoff period and STA1 randomly selecting a backoff period to wait. The time interval between when STA2 resumes the countdown of the random backoff period and the end of the random backoff period is referred to as a remaining backoff 231. When remaining backoff 231 expires, STA2 is able to obtain access to the wireless channel and transmits a frame.

In cellular communications systems, e.g., Third Generation Partnership Project (3GPP) Long Term Evolution (LTE) compliant communications systems, orthogonal frequency division multiple access (OFDMA) has been shown to be able to provide robust performance in high density environments. OFDMA has the ability to support multiple users simultaneously by carrying traffic from different users on different portions of the bandwidth of the communications system. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multiuser multiple input multiple output (UL MU-MIMO) has also been used in cellular communications systems (e.g., 3GPP LTE) to enhance communications system performance. UL MU-MIMO allows multiple users to transmit simultaneously on the same network resource (e.g., a time-frequency resource) with the transmissions being separated in space, e.g., on different spatial streams.

An example of using OFDMA in the UL (UL-OFDMA) is to provide support for voice over Internet Protocol (VoIP) service. Although VoIP has relatively strict delay and latency requirements, the traffic from each station is low, and is periodic in nature (e.g., a packet per station every 20 ms). In order for a station to transmit the VoIP packets, resources have to be periodically scheduled (e.g., one packet every 20 ms). If every resource has to be signaled in periodic scheduling messages, significant communications overhead will result.

Alternatively, the periodic resources may be scheduled and reserved at the beginning of the VoIP session, therefore periodic scheduling messages may be not needed every 20 ms in this scheme. However, due to the loose requirement on timing accuracy inherent in WLAN systems, the station's clocks will drift over time and the stations will lose synchronization among themselves as the communications continue. Furthermore, since UL-OFDMA requires that the transmitted signal of multiple stations arrive at the receiver of the AP at substantially the same time, losing synchronization will result in the failure of UL-OFDMA.

On the other hand, 3GPP LTE compliant communications systems are synchronous with all evolved NodeBs (eNBs) and user equipments (UEs) in the communications system following the same clock. In 3GPP LTE compliant communications systems, periodic resources can be allocated in a semi-persistent way. The periodic resources may be scheduled once at the beginning of the communications. There are no issues with UL-OFDMA since the communications system is synchronous and the requirements on timing accuracy are much more stringent.

In co-assigned U.S. patent application Ser. No. 14/595, 944, filed Jan. 13, 2015, entitled "System and Method for Uplink OFDMA transmission", which is hereby incorporated herein by reference, systems and methods are disclosed wherein an AP periodically sends a short synchronous signal (SSS) to trigger periodic uplink multiple user transmissions, such as MU, OFDMA, MU-MIMO, and so on. The disclosed systems and methods provide good support for a single periodic UL MU transmission.

In IEEE 802.11, an AP periodically transmits a Beacon frame. AP also transmits trigger frames to trigger UL-OFDMA and/or UL MU-MIMO transmissions. Some types of trigger frames may include a stand-alone downlink frame comprising control information such as the uplink scheduling information, or a downlink frame where the control information such as the uplink scheduling information is sent together with other downlink data. The trigger frame can be in the form of a media access control (MAC) frame. The trigger frame can also be in the form of a null data packet (NDP) frame.

Figure 3:
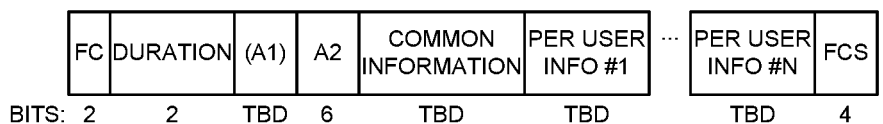
FIG. 3 illustrates a format of a trigger frame as disclosed in IEEE contribution 11-15-0132r13.

FIG. 3 illustrates a format of a trigger frame 300 as disclosed in IEEE contribution 11-15-0132r13. Trigger frame 300 includes a frame control (FC) field, a duration field, an A1 field, an A2 field, a Common Information field, up to an integer N Per User Information fields, and a frame check sequence (FCS) field. Common Information field includes information for all stations signaled in trigger frame 300, while each of the N Per User Information fields includes information for a corresponding station only.

The Common Information field includes the following subfields:
  a length field (12 bits),
  information bits content of a SIG-A field of the response UL MU physical layer protocol data unit (PPDU) (length to be determined),
  cyclic prefix (CP) and high efficiency long training fields (HE LTF) (length to be determined), and
  an allowed response type/trigger type (ART/TT) field (length to be determined).

The Per User Information field includes the following subfields:
  modulation coding scheme (MCS) field (4 bits),
  coding type field (length to be determined), resource unit (RU) allocation information field (length to be determined), spatial stream (SS) allocation field (length to be determined), dual carrier modulation (DCM) field (1 bit), and user identifier field (12 bits).

According to an example embodiment, periodic UL MU scheduling is supported using the above presented trigger frame format with reduced signaling overhead. According to an example embodiment, a periodic scheduling indicator is included in a trigger frame to indicate that the trigger frame is used for scheduling periodic UL MU transmissions. The periodic scheduling indicator is decodable by all scheduled stations so that the schedules stations are informed that the trigger frame is used for scheduling periodic UL MU transmissions.

According to an example embodiment, compressed scheduling information is signaled in some circumstances to help reduce signaling overhead. In general, once periodic scheduling for a station is configured, it may not be necessary to repeatedly signal the scheduling information since doing so involves the signaling of information that has not been changed. As an illustrative example, many communications parameters such as MCS, coding type, RU allocation information, and so forth, typically do not change and repeatedly signaling such parameters only consume valuable communications system resources. Therefore, after an initial signaling of the scheduling information (i.e., full scheduling information), it may be sufficient to signal a subset of the scheduling information (i.e., compressed scheduling information). Furthermore, if there is a change to one or more of the communications parameters, only the changed communications parameters are signaled. As an example, compressed scheduling information may include as little as user identification information to help a scheduled station identify that it is an intended recipient of the trigger frame. The ability to address user identification information in the trigger frame to different stations enables the support of multiple periodic UL MU transmission operation.

According to an example embodiment, a compression indicator is used to indicate if the scheduling information for a particular scheduled station is full scheduling information (i.e., the scheduling information includes all of the parameters needed for the periodic communications) or compressed scheduling information (i.e., the scheduling information includes a subset of the full scheduling information). Every station scheduled by the trigger frame may have its own compression indicator.

Figure 4A:
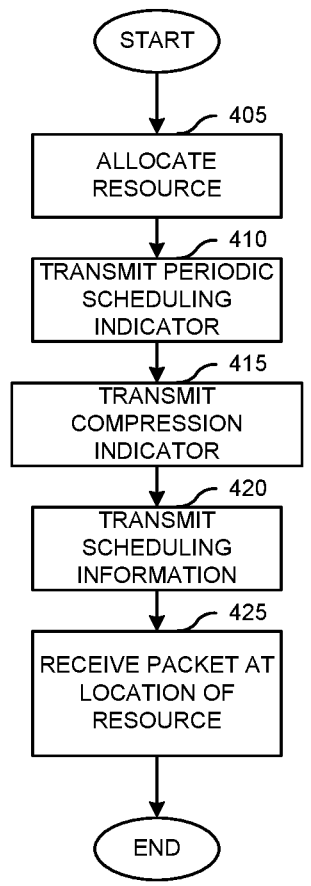
FIG. 4A illustrates a flow diagram of example operations occurring in an AP.

FIG. 4A illustrates a flow diagram of example operations 400 occurring in an AP. Operations 400 may be indicative of operations occurring in an AP as the AP communicates with stations.

Operations 400 begin with the AP allocating a resource for a station (block 405). The resource may correspond to a periodic transmission for the station. The AP generates and transmits a periodic scheduling indicator in a trigger frame (block 410). The periodic scheduling indicator indicates that the trigger frame is used for scheduling periodic transmissions, such as periodic UL MU transmissions. The AP transmits compression indicators for stations scheduled in the trigger frame (block 415). A compression indicator indicates whether scheduling information for a station is compressed scheduling information. For stations with compression indicators indicating full scheduling information, the AP transmits full scheduling information, and for stations with compression indicators indicating compressed scheduling information, the AP transmits compressed scheduling information (block 420). The AP receives a packet from a station at the location of the resource (block 425). The AP may transmit a trigger frame to carry the periodic scheduling indicator (block 410), the compression indicators (block 415), and the scheduling information (block 420), instead of transmitting multiple frames to carry the indicators and the scheduling information.

Figure 4B:
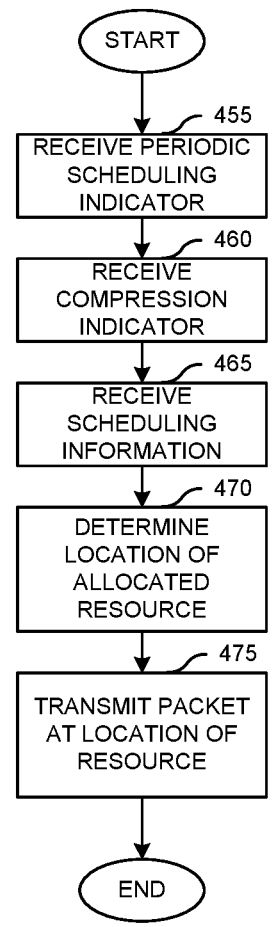
FIG. 4B illustrates a flow diagram of example operations occurring in a station.

FIG. 4B illustrates a flow diagram of example operations 450 occurring in a station. Operations 450 may be indicative of operations occurring in a station as the station communicates with an AP.

Operations 450 begin with the station receiving a periodic scheduling indicator (block 455). The periodic scheduling indicator may be received in a trigger frame. The periodic scheduling indicator indicates if the trigger frame is used for scheduling periodic transmissions or not. The station receives a compression indicator (block 460). The compression indicator indicates whether scheduling information for the station is compressed scheduling information. The station receives the scheduling information (block 465). The scheduling information may either be full scheduling information or compressed scheduling information as indicated by the compression indicator. The station determines a location of an allocated resource (block 470). The determination of the location of the allocated resource is in accordance with the scheduling information. If the station received full scheduling information, the location of the allocated resource may be determined from the received full scheduling information. If the station received compressed scheduling information, the location of the allocated resource may be determined from the compressed scheduling information and a stored version of the full scheduling information previously received by the station. As an illustrative example, the station may update the stored version of the full scheduling information with the compressed scheduling information (as well as with previously received compressed scheduling information) and use the updated full scheduling information to determine the location of the allocated resource. The station transmits a packet at the location of the allocated resource (block 475). The station may receive a trigger frame which carries the periodic scheduling indicator (block 455), the compression indicators (block 460), and the scheduling information (block 465), instead of receiving multiple frames which carry the indicators and the scheduling information.

According to an example embodiment, the periodic scheduling indicator is signaled by an AP in a Common Information field of a trigger frame and user specific scheduling information is signaled in Per User Information fields of the trigger frame.

As an illustrative example, the AP indicates periodic UL scheduling by utilizing the ART/TT field in the Common Information field of the trigger frame. For example, a defined ART/TT field value (e.g., all 0 bits or all 1 bits or some other sequence of bits) will indicate that the trigger frame is for scheduling periodic UL MU transmissions. Therefore, the ART/TT field is used as a periodic scheduling indicator.

When the value in the ART/TT field of the Common Information field is set to a value to indicate that the trigger frame is for scheduling periodic UL MU transmissions, each of the Per User Information fields in the trigger frame includes a compression indicator that indicates whether full scheduling information is included in the particular Per User Information field (when the compression indicator is set to a first value) or compressed scheduling information is included in the particular Per User Information field (when the compression indicator is set to a second value).

The total signaling overhead of the periodic UL scheduling may be reduced. The use of compressed scheduling information avoids the transmission of the full scheduling information that has already been successfully received by the stations every time periodic UL scheduling occurs.

Figure 5A:
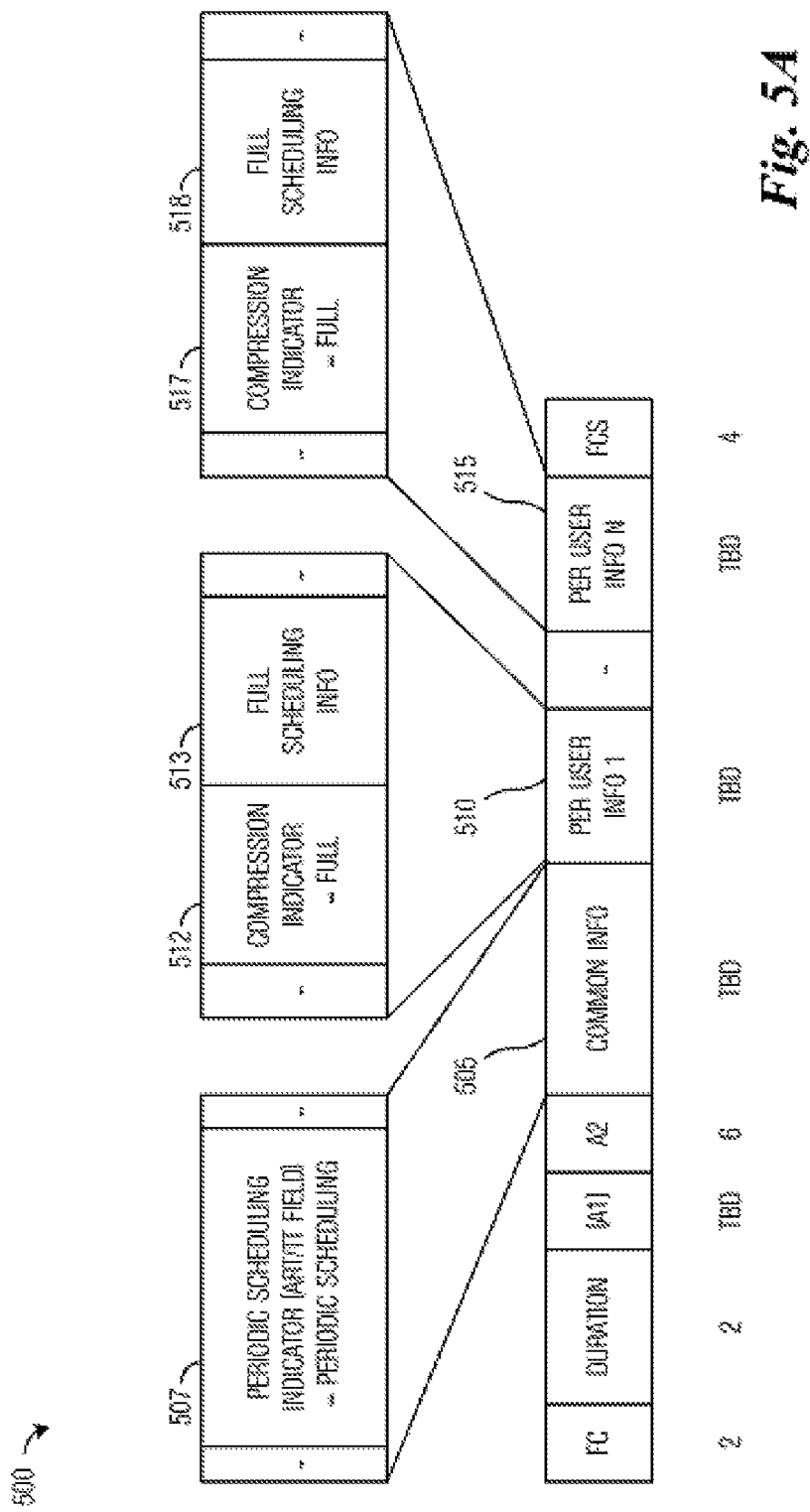
FIG. 5A illustrates a first example trigger frame.

FIG. 5A illustrates a first example trigger frame 500. Trigger frame 500 includes a Common Information field 505. In Common Information field 505, an ART/TT field 507 indicates if trigger frame 500 is used for scheduling periodic transmissions. In other words, ART/TT field 507 is used as a periodic scheduling indicator. As an illustrative example, if ART/TT field 507 is set to a specified value, e.g., all 0 bits or all 1 bits or some other sequence of bits, then trigger frame 500 is used for scheduling periodic transmissions. While if ART/TT field 507 is not set to the specified value, then trigger frame 500 is not used for scheduling periodic transmissions.

If trigger frame 500 is used for scheduling periodic transmissions, then the Per User Information fields, such as Per User Information field 510 and Per User Information field 515, each include a compression indicator, for example, compression indicator 512 for Per User Information field 510 and compression indicator 517 for Per User Information field 515. The compression indicators indicate if the scheduling information included in the Per User Information fields is full scheduling information or compressed scheduling information. As shown in FIG. 5A, compression indicators 512 and 517 are both indicating that the scheduling information included in the respective Per User Information fields are full scheduling information (full scheduling information 513 and full scheduling information 518).

According to an example embodiment, the compression indicators in the Per User Information fields of a trigger frame are independent. The compression indicators in the Per User Information fields of a trigger frame do not all have to be set to the same value. As an illustrative example, the AP, after sending the full scheduling information for periodic UL MU transmissions determines that some of the scheduled stations did not receive the full scheduling information correctly (e.g., by determining that the corresponding UL transmission was not received correctly), therefore the AP sends the full scheduling information for these scheduled stations while sending compressed scheduling information to those scheduled stations that has successfully received the full scheduling information. As another illustrative example, a compression indicator associated with a station with an ongoing periodic transmission indicates that the scheduling information is compressed, while a compression indicator associated with a station with a newly initiated periodic transmission indicates that the scheduling information is full. As other illustrative example, in the beginning of the communication, the AP indicates full scheduling information for the periodic UL MU transmission, so the compressed indicator is set to indicate that full scheduling information is indicated in the Per User Info field. In the following trigger frame scheduling periodic UL MU transmission, the AP can set the compressed indicator in the Per User Info field to indicate that compressed scheduling information is indicated in the Per User Info field, so not all the subfields of the Per User Info field are included. For example, only the "user identifier field" is included (and potentially the power control related parameters), and the other subfields such as MCS, coding type, RU allocation information, etc., are omitted, and the ones indicated in the previous "full" scheduling indication will be re-used by the station when the station receive the trigger frame.

The ability to independently set the compression indication for different stations allows the AP the flexibility to send full or compressed scheduling information to different stations in a single trigger frame. This enables the AP to handle different stations with different UL transmission statuses, e.g., receiving correctly or not.

Figure 5B:
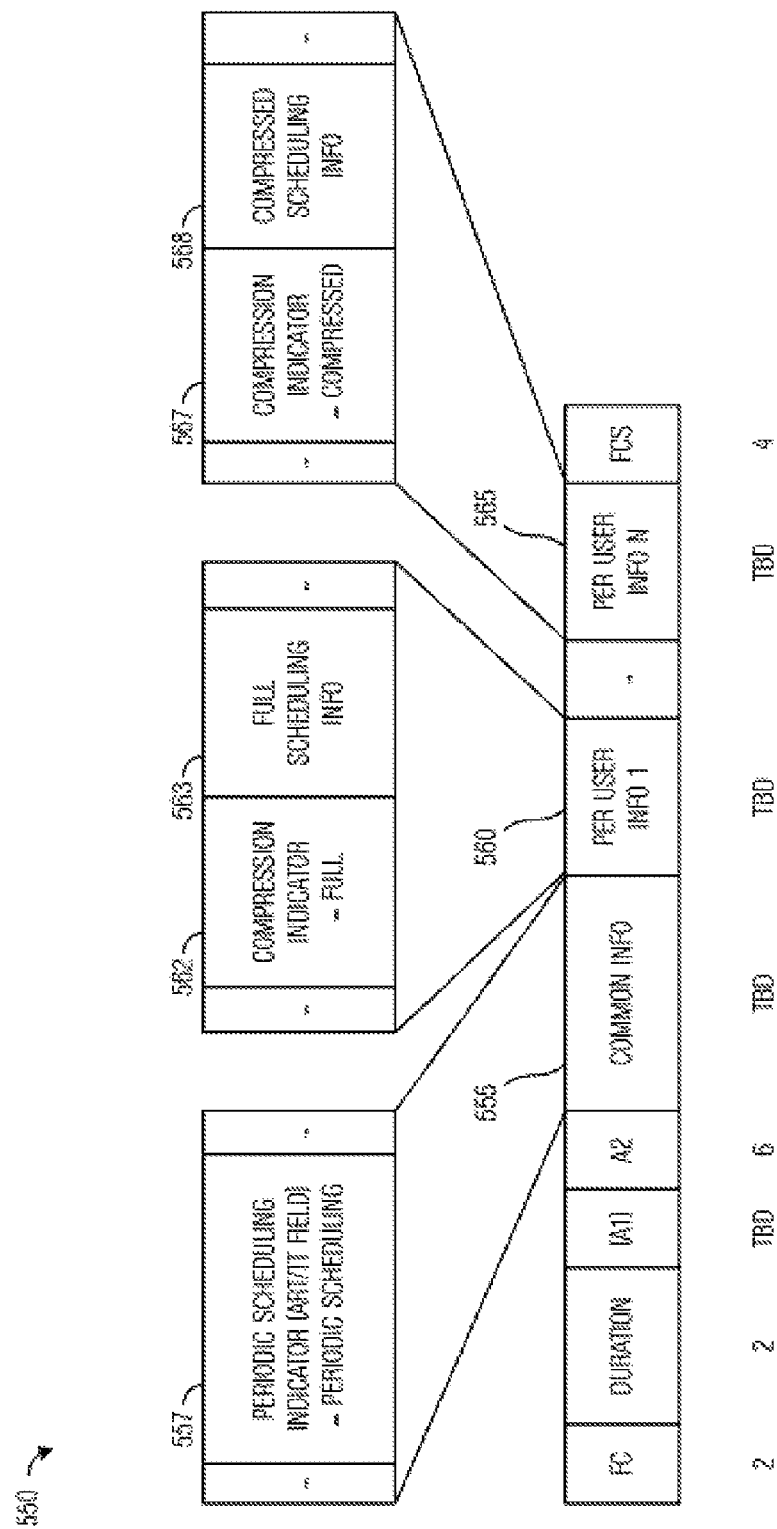
FIG. 5B illustrates a second example trigger frame.

FIG. 5B illustrates a second example trigger frame 550. Trigger frame 550 includes a Common Information field 555. In Common Information field 555, an ART/TT field 557 indicates if trigger frame 550 is used for scheduling periodic transmissions. As an illustrative example, if ART/TT field 557 is set to a specified value, e.g., all 0 bits or all 1 bits or some other sequence of bits, then trigger frame 550 is used for scheduling periodic transmissions. While if ART/TT field 557 is not set to the specified value, then trigger frame 550 is not used for scheduling periodic transmissions.

If trigger frame 550 is used for scheduling periodic transmissions, then the Per User Information fields, such as Per User Information field 560 and Per User Information field 565, include a compression indicator, for example, compression indicator 562 for Per User Information field 560 and compression indicator 567 for Per User Information field 565. The compression indicators indicate if the scheduling information included in the Per User Information fields is full scheduling information or compressed scheduling information. As shown in FIG. 5B, compression indicator 562 indicates that the scheduling include in a respective Per User Information field is full scheduling information (full scheduling information 563), but compression indicator 567 indicates that the scheduling information included in a respective Per User Information field is compressed scheduling information (compressed scheduling information 568).

A station, after receiving the trigger frame, may determine if the trigger frame is being used for periodic scheduling by examining the ART/TT field in the Common Information field of the trigger frame. If the station determines that the trigger frame is being used for periodic scheduling, the station performs a check of its corresponding Per User Information field to determine if the scheduling information in the Per User Information field comprises full scheduling information or compressed information. The station may make this determination by examining the compression indicator located in its corresponding Per User Information field.

If the station determines that full scheduling information is included (e.g., compression indicator=full), the station will use the full scheduling information (e.g., MCS, RU allocation, and so on) for its UL transmission. As an illustrative example, the station uses the full scheduling information to determine the communications parameters of the UL transmission, as well as a location of a resource allocated for the UL transmission. The station also stores or updates the full scheduling information for future use.

If the station determines that compressed scheduling information is included (e.g., compression indicator=compressed), the station updates the most recent version of full scheduling information that it has stored with any possible changes included in the compressed scheduling information to determine the full scheduling information, and stores/updates the full scheduling information for future use. The station sends UL traffic in accordance with the full scheduling information.

Figure 6:
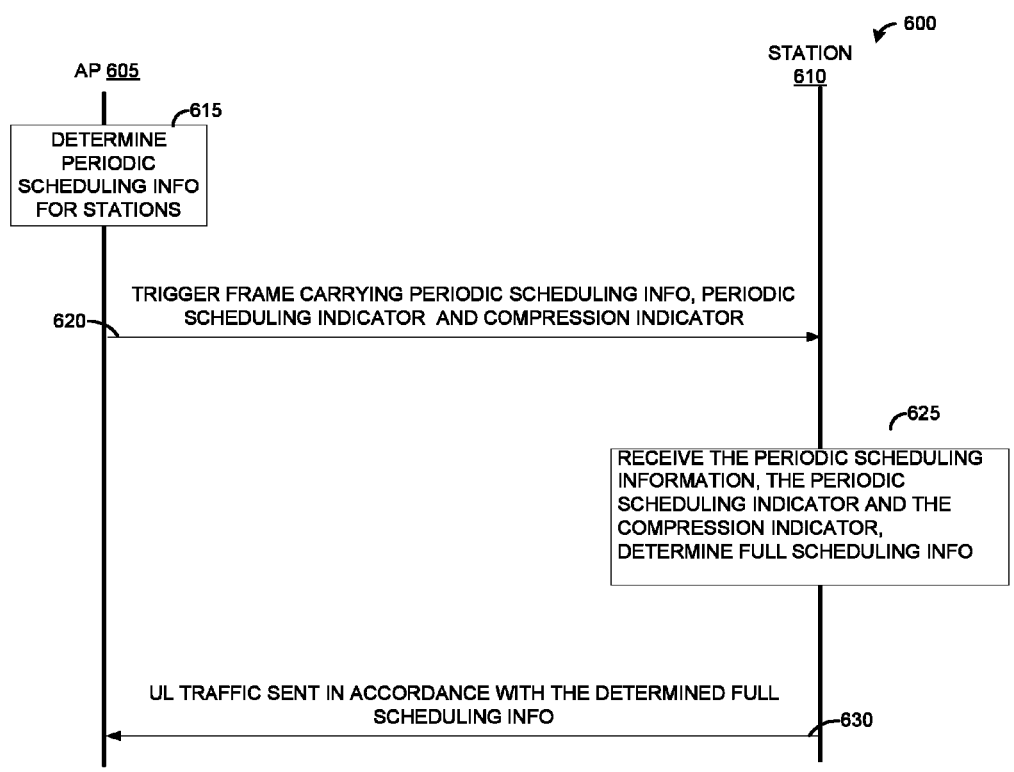
FIG. 6 illustrates a message exchange diagram highlighting messages exchanged and processing performed in devices participating in periodic UL transmissions.

FIG. 6 illustrates a message exchange diagram highlighting messages exchanged and processing performed in devices participating in periodic UL transmissions. Message exchange diagram 600 displays messages exchanged and processing performed in an AP 605 and a station 610. AP 605 determines periodic scheduling information for stations, as well as allocated resources for UL transmissions, communications parameters, and the like (block 615). AP 605 sends a trigger frame carrying periodic scheduling information (in either full or compressed form), a periodic scheduling indicator in a Common Information field set with a value to indicate that the trigger frame is used for scheduling periodic UL transmissions, and compression indicators in Per User Information fields to indicate the nature of the periodic scheduling information (either full or compressed) (shown as event 620). Examples of such trigger frames are shown in FIGS. 5A and 5B.

Station 610 receives the periodic scheduling information in accordance with the periodic scheduling indicator in the Common Information field and the compression indicator associated with station 610 in a corresponding Per User Information field (block 625). If the periodic scheduling indicator indicates periodic scheduling and if the compression indicator indicates full scheduling information, station 610 uses the full scheduling information included in the corresponding Per User Information field for UL transmission and stores/updates the full scheduling information for future use. If the periodic scheduling indicator indicates periodic scheduling and if the compression indicator indicates compressed scheduling information, station 610 updates the most recent version of full scheduling information that it has stored with any possible changes included in the compressed scheduling information to determine the full scheduling information, and stores/updates the full scheduling information for future use. Station 610 sends UL traffic in accordance with the full scheduling information (shown as event 630). The UL traffic is sent one SIFS after the end of the trigger frame.

According to an example embodiment, the periodic scheduling indicator is signaled in a first Per User Information field associated with a first station and user specific scheduling information is signaled in subsequent Per User Information fields of the trigger frame. Inclusion of the periodic scheduling indicator in the first Per User Information field instead of the Common Information field (specifically the ART/TT field of the Common Information field) may be advantageous if there are no available values in the ART/TT field to be used as the periodic scheduling indicator.

Figure 7A:
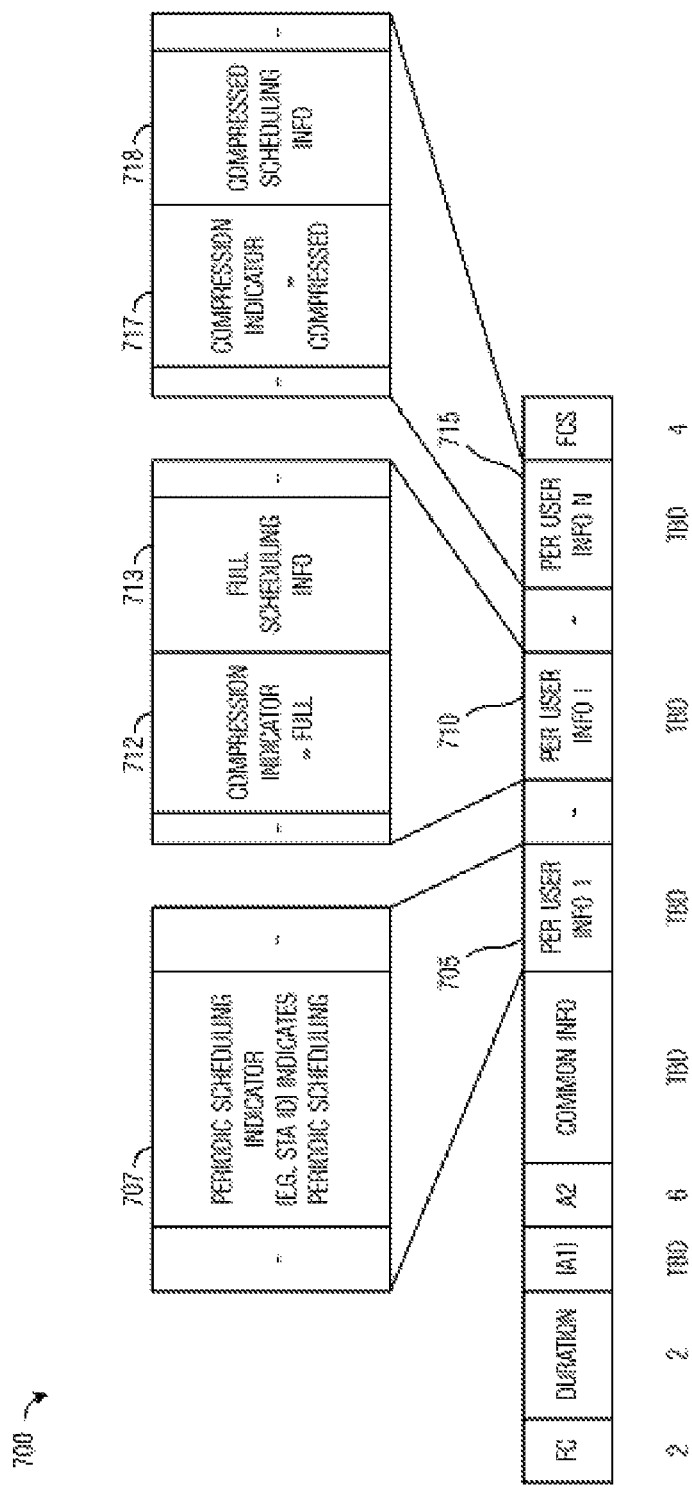
FIG. 7A illustrates a third example trigger frame.

FIG. 7A illustrates a third example trigger frame 700. Trigger frame 700 includes a plurality of Per User Information fields, such as Per User Information field #1 705, Per User Information field #i 710, and Per User Information field #N 715. Per User Information field #1 705 includes a periodic scheduling indicator 707 to indicate if trigger frame 700 is used for scheduling periodic transmissions. As an illustrative example, a user identifier field in Per User Information field #1 705 is set to a specified value (e.g., all 0 bits or all 1 bits or some other sequence of bits) then trigger frame 700 is used for scheduling periodic transmissions. The remaining N−1 Per User Information fields are used to provide user specific scheduling information to scheduled stations. As an example, Per User Information field #i 710 includes a compression indicator 712 (which is shown in FIG. 7A to indicate that full scheduling information is provided) and full scheduling information 713 for station #i−1, while Per User Information field #N 715 includes a compression indicator 717 (which is shown in FIG. 7A to indicate that compressed scheduling information is provided) and compressed scheduling information 718 for station #N−1.

When the periodic scheduling indicator is set to the specified value to indicate that trigger frame 700 is used for scheduling periodic transmissions, each of the following Per User Information fields in the trigger frame comprises a compression indicator and either full or compressed scheduling information per the compression indicator.

After receiving a trigger frame, a station performs a check to determine if the trigger frame is used for scheduling periodic transmissions by examining the first Per User Information field. If the periodic scheduling indicator included in the first Per User Information field indicates that the trigger frame is used for scheduling periodic transmissions (e.g., the user identifier field is set to a specified value), the station examines its corresponding Per User Information field to determine if a compression indicator in the corresponding Per User Information field indicates full or compressed scheduling information is included. If full scheduling information is included (e.g., compression indicator=full), the station will use the full scheduling information (e.g., MCS, RU allocation, and so on) for its UL transmission. As an illustrative example, the station uses the full scheduling information to determine the communications parameters of the UL transmission, as well as a location of a resource allocated for the UL transmission. The station also stores or updates the full scheduling information for future use. If compressed scheduling information is included (e.g., compression indicator=compressed), the station updates the most recent version of full scheduling information that it has stored with any possible changes included in the compressed scheduling information to determine the full scheduling information, and stores/updates the full scheduling information for future use. The station sends UL traffic in accordance with the full scheduling information.

According to an example embodiment, the periodic scheduling indicator is signaled in a first Per User Information field associated with a first station and user specific scheduling information is signaled in all Per User Information fields of the trigger frame. The inclusion of scheduling information and associated compression indicator in the first Per User Information field helps to reduce signaling overhead.

Figure 7B:
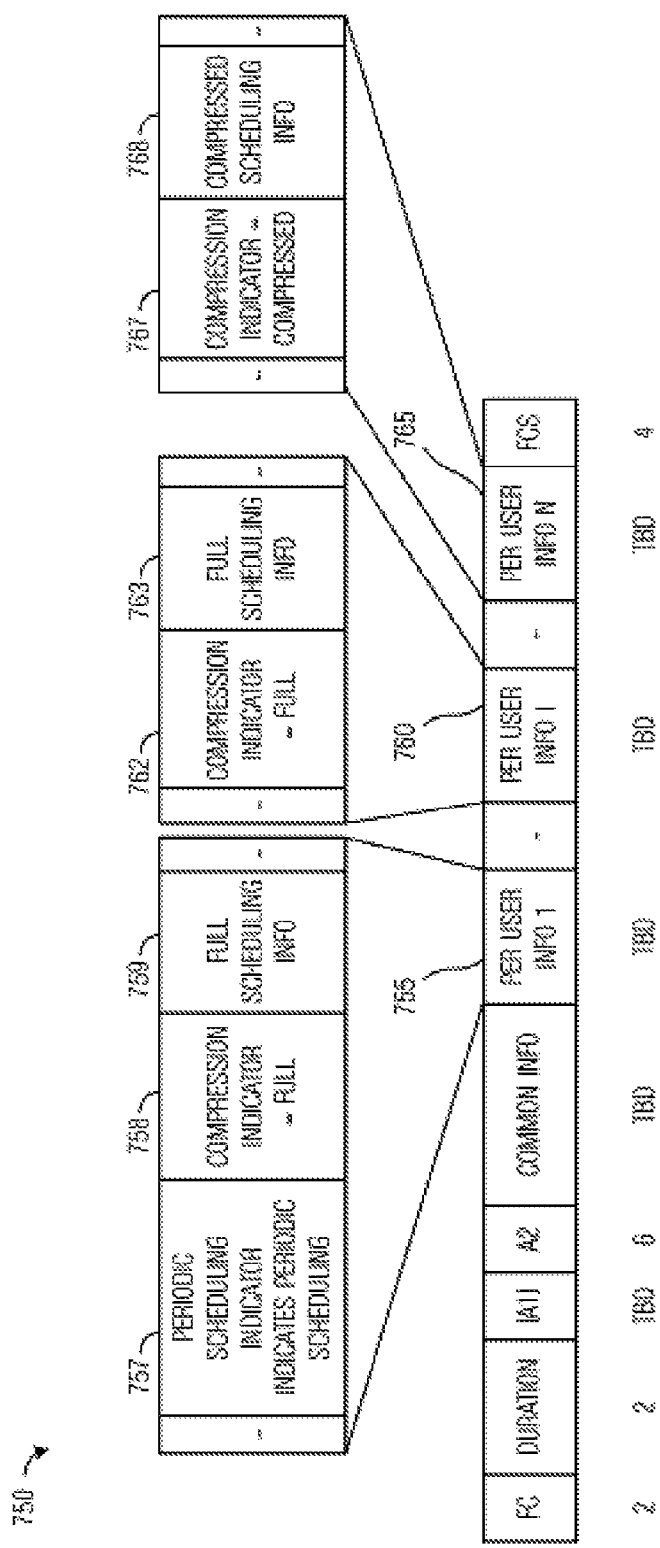
FIG. 7B illustrates a fourth example trigger frame.

FIG. 7B illustrates a fourth example trigger frame 750. Trigger frame 750 includes a plurality of Per User Information fields, such as Per User Information field #1 755, Per User Information field #i 760, and Per User Information field #N 765. Per User Information field #1 755 includes a periodic scheduling indicator 757 to indicate if trigger frame 750 is used for scheduling periodic transmissions. Per User Information field #1 755 also includes a compression indicator 758 (which is shown in FIG. 7B to indicate that full scheduling information is provided) and full scheduling information 759 for station #1, while Per User Information field #i 760 includes a compression indicator 762 (which is shown in FIG. 7B to indicate that full scheduling information is provided) and full scheduling information 763 for station #i and Per User Information field #N 765 includes a compression indicator 767 (which is shown in FIG. 7B to indicate that compressed scheduling information is provided) and compressed scheduling information 768 for station #N.

According to an example embodiment, a periodic scheduling indicator is included in each Per User Information field to indicate if the scheduling information included in the Per User Information field is used for periodic scheduling. As an illustrative example, a 1 bit periodic scheduling indicator is included in each Per User Information field and if the periodic scheduling indicator for a particular Per User Information field is set to a first value (e.g., "1"), the scheduling information included in the particular Per User Information field is used for periodic scheduling, while if the periodic scheduling indicator for the particular Per User Information field is set to a second value (e.g., "0"), the scheduling information included in the particular Per User Information field is not used for periodic scheduling.

According to an example embodiment, when the periodic scheduling indicator of a particular Per User Information field indicates that the accompanying scheduling information is used for periodic scheduling, the particular Per User Information field also includes a compression indicator indicating if the particular scheduling information is full scheduling information or compressed scheduling information. The inclusion of periodic scheduling indicators in individual Per User Information fields enables both periodic scheduling information and non-periodic scheduling information to be sent in a single trigger frame, which allows greater scheduling flexibility for the AP. As an example, if there are many stations using non-periodic transmissions and only a small number of stations using periodic transmissions, entire trigger frames do not need to be dedicated solely to scheduling periodic transmissions since they will typically rarely occur. Dedicating entire trigger frames to schedule rarely used periodic transmissions may decrease signaling efficiency.

After receiving a trigger frame, a station performs a check to determine if the trigger frame is used for scheduling periodic transmissions by examining its corresponding Per User Information field. If the periodic scheduling indicator included in the corresponding Per User Information field indicates that the scheduling information included in the corresponding Per User Information field is used for scheduling periodic transmissions (e.g., the periodic scheduling indicator in the corresponding Per User Information field is set to a first value), the station examines the corresponding Per User Information field to determine if a compression indicator in the corresponding Per User Information field indicates full or compressed scheduling information is included. If full scheduling information is included (e.g., compression indicator=full), the station will use the full scheduling information (e.g., MCS, RU allocation, and so on) for its UL transmission. As an illustrative example, the station uses the full scheduling information to determine the communications parameters of the UL transmission, as well as a location of a resource allocated for the UL transmission. The station also stores or updates the full scheduling information for future use. If compressed scheduling information is included (e.g., compression indicator=compressed), the station updates the most recent version of full scheduling information that it has stored with any possible changes included in the compressed scheduling information to determine the full scheduling information, and stores/updates the full scheduling information for future use. The station sends UL traffic in accordance with the full scheduling information.

Figure 8A:
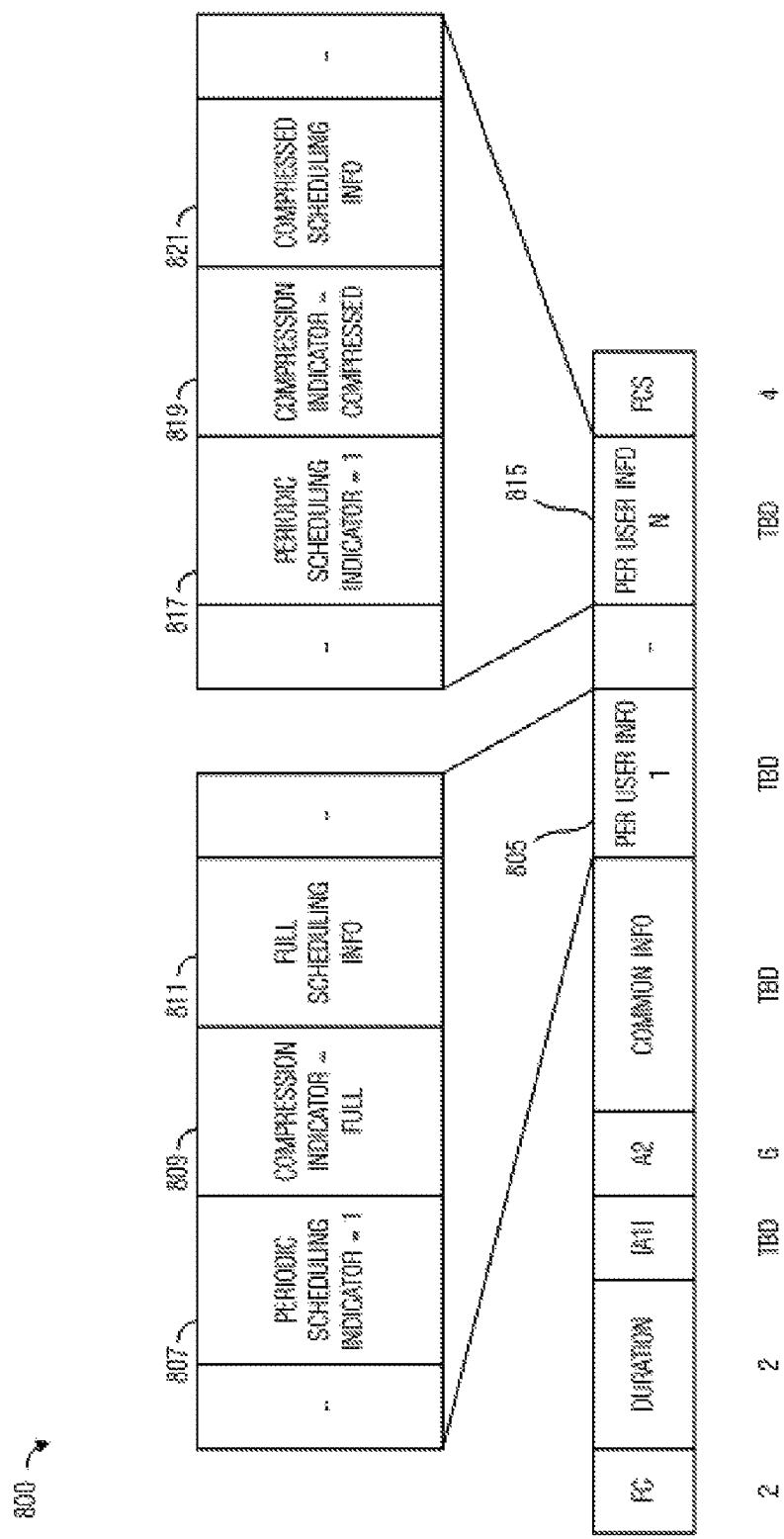
FIG. 8A illustrates a fifth example trigger frame.

FIG. 8A illustrates a fifth example trigger frame 800. Trigger frame 800 includes a plurality of Per User Information fields, such as Per User Information field #1 805, and Per User Information field #N 815. Per User Information field #1 805 includes a periodic scheduling indicator 807 to indicate if scheduling information included in Per User Information field #1 805 is used for scheduling periodic transmissions. As an illustrative example, periodic scheduling indicator 807 is set to a first value, then the scheduling information included in Per User Information field #1 805 is used for scheduling periodic transmissions. As shown in FIG. 8A, periodic scheduling indicator 807 indicates that the scheduling information included in Per User Information field #1 805 is used for scheduling periodic transmissions and compression indicator 809 indicates that full scheduling information is provided, therefore, Per User Information field #1 805 includes full scheduling information 811. Also shown in FIG. 8A, periodic scheduling indicator 817 of Per User Information field #N 815 indicates that the scheduling information included in Per User Information field #N 815 is used for scheduling periodic transmissions but compression indicator 819 indicates that compressed scheduling information is provided, therefore, Per User Information field #N 815 includes compressed scheduling information 821.

Figure 8B:
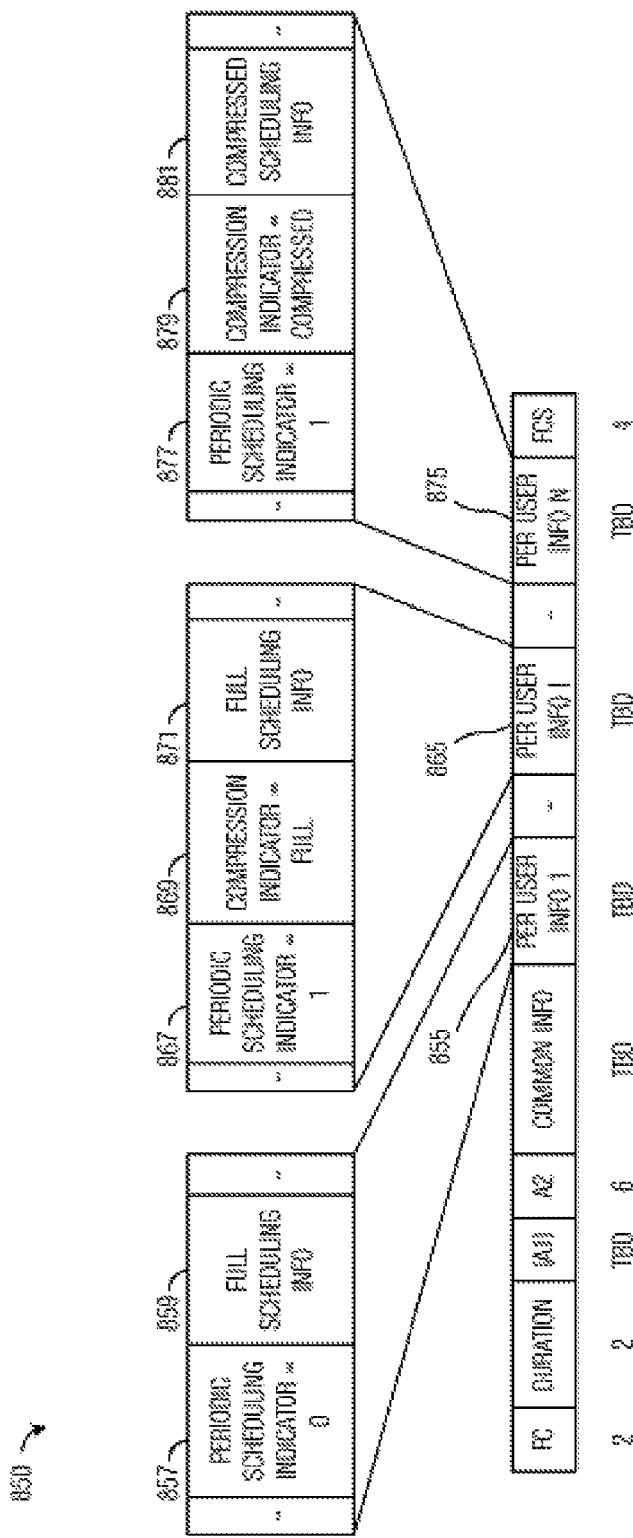
FIG. 8B illustrates a sixth example trigger frame.

FIG. 8B illustrates a sixth example trigger frame 850. Trigger frame 850 includes scheduling information for periodic and non-periodic transmissions. Trigger frame 850 includes a plurality of Per User Information fields, such as Per User Information field #1 855, Per User Information field #i 865, and Per User Information field #N 875. As shown in FIG. 8B, Per User Information field #1 855 is used to schedule a non-periodic transmission, with a periodic scheduling indicator 857 set to indicate non-periodic scheduling information and User Information field #1 855 includes full scheduling information 859. Per User Information #i 865 is used to schedule a periodic transmission with full scheduling information, therefore, periodic scheduling indicator 867 is set to indicate periodic scheduling information and compression indicator 869 is set to indicate full scheduling information and User Information field #i 865 includes full scheduling information 871. Per User Information #N 875 is used to schedule a periodic transmission with compressed scheduling information, therefore, periodic scheduling indicator 877 is set to indicate periodic scheduling information and compression indicator 879 is set to indicate compressed scheduling information and User Information field #N 875 includes compressed scheduling information 881.

According to an example embodiment, the Per User Information fields of a trigger frame are ordered by scheduling information type. In other words, the Per User Information fields are arranged based on the compression indicators. As an illustrative example, the Per User Information fields with compression indicator indicating full scheduling information are arranged at the beginning of the trigger frame and the Per User Information fields with compression indicator indicating compressed scheduling information are arranged at the end of the trigger frame. Arranging the Per User Information fields enable the stations to more readily process the scheduling information included therein. As an illustrative example, if a station determines that its corresponding Per User Information field includes compressed scheduling information, the station is able to deduce that the subsequent Per User Information fields also include compressed scheduling information, therefore, the station is able to process the scheduling information assuming a fixed size.

The example embodiments disclosed herein enable the periodic scheduling of transmissions with a reduction in signaling overhead. Furthermore, the example embodiments enable the use of OFDMA and MU-MIMO in a periodic manner on the UL, allowing for the efficient use of resources.

Figure 9:
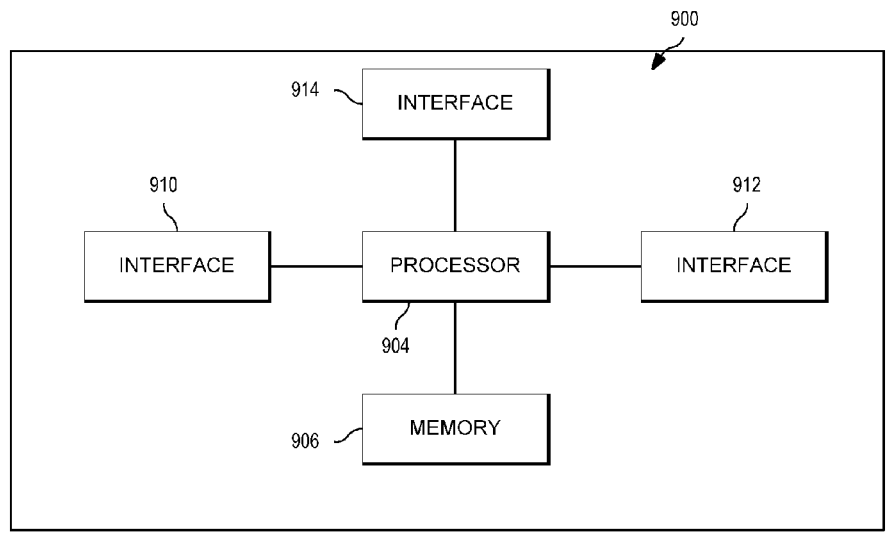
FIG. 9 illustrates a block diagram of an embodiment processing system for performing methods described herein.

FIG. 9 illustrates a block diagram of an embodiment processing system 900 for performing methods described herein, which may be installed in a host device, such as an AP or a station. As shown, the processing system 900 includes a processor 904, a memory 906, and interfaces 910, 912 and 914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 910, 912, 914 connects the processing system 900 to a transceiver adapted to transmit and receive signaling over the telecommunications network.

Figure 10:
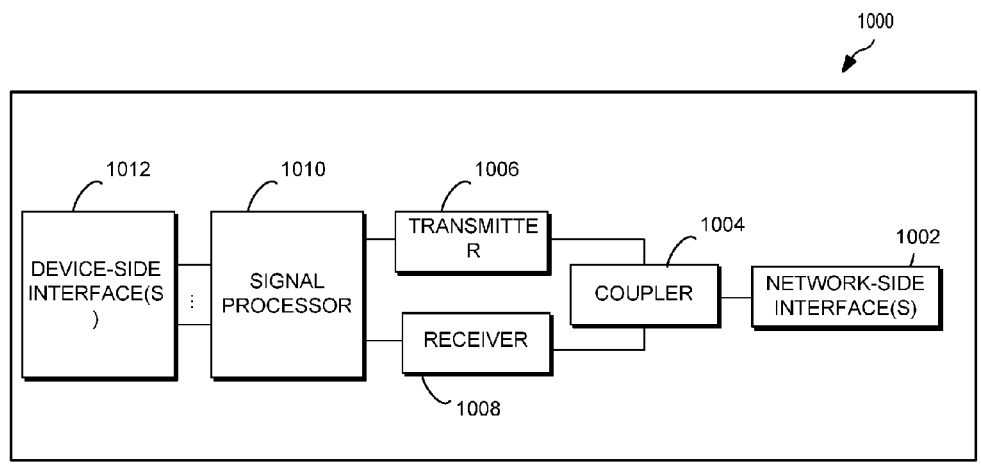
FIG. 10 illustrates a block diagram of a transceiver adapted to transmit and receive signaling over a telecommunications network.

FIG. 10 illustrates a block diagram of a transceiver 1000 adapted to transmit and receive signaling over a telecommunications network. The transceiver 1000 may be installed in a host device, such as an AP or a station. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:
 IEEE contribution 11-13-0331r5, "High-efficiency WLAN", Orange, et al;
 IEEE contribution 11-13-0339r10, "High-efficiency WLAN Straw poll", Orange, et al;
 U.S. patent application Ser. No. 14/595,944 (Huawei ID HW 91012629US02), "System and Method for Uplink OFDMA Transmission", Zhigang Rong, et al; and
 IEEE contribution 11-15-0132r13, "Specification Framework for TGax", Intel.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method of communicating in a wireless communications system, the method comprising:
 receiving, by a station, a periodic scheduling indicator, a compression indicator and scheduling information from an access point (AP), wherein the periodic scheduling indicator indicates whether a periodic transmission is scheduled for the station, and wherein the compression indicator indicates whether the scheduling information for the station is full scheduling information or compressed scheduling information;
 determining, by the station, full scheduling information in accordance with the periodic scheduling indicator, the compression indicator and the scheduling information;
 transmitting, by the station, a packet in accordance with the full scheduling information to the AP;
 wherein the periodic scheduling indicator is located in a first Per User Information field of the trigger frame,
 wherein the compression indicator is located in a second Per User Information field of the trigger frame associated with the station, wherein the scheduling information includes the compressed scheduling information, and wherein determining the full scheduling information comprises:
receiving the compressed scheduling information in the second Per User Information field of the trigger frame associated with the station, and
obtaining the full scheduling information according to stored full scheduling information and the compressed scheduling information.

2. The method of claim 1, wherein the periodic scheduling indicator is located in a Common Information field of a trigger frame.

3. The method of claim 2, wherein the compression indicator is located in a Per User Information field of the trigger frame associated with the station.

4. The method of claim 1, wherein the periodic scheduling indicator is located in a first Per User Information field of a trigger frame.

5. The method of claim 4, wherein the compression indicator is located in a Per User Information field of the trigger frame associated with the station.

6. The method of claim 1, wherein when the compression indicator indicates full scheduling information, and wherein determining the full scheduling information comprises:
receiving the full scheduling information in a Per User Information field of a trigger frame associated with the station.

7. The method of claim 1, further comprising
storing the full scheduling information in the station.

8. A method for communicating in a wireless communications system, the method comprising:
transmitting, by an access point, a periodic scheduling indicator, a compression indicator and scheduling information, wherein the periodic scheduling indicator indicates whether a periodic transmission is scheduled for a station, and wherein the compression indicator indicates whether the scheduling information for the station is compressed scheduling information;
receiving, by the access point, a packet from the station in accordance with the scheduling information, the periodic scheduling indicator, and the compression indicator;
wherein the periodic scheduling indicator is located in a first Per User Information field of the trigger frame,
wherein the compression indicator is located in a second Per User Information field of the trigger frame associated with the station,
wherein the scheduling information includes the compressed scheduling information, and wherein determining the full scheduling information comprises:
receiving the compressed scheduling information in the second Per User Information field of the trigger frame associated with the station, and
obtaining the full scheduling information according to stored full scheduling information and the compressed scheduling information.

9. The method of claim 8, wherein the periodic scheduling indicator is located in a Common Information field of a trigger frame.

10. The method of claim 9, wherein the periodic scheduling indicator is located in an allowed response type/trigger type subfield of the Common Information field.

11. The method of claim 9, wherein the compression indicator is located in a Per User Information field of the trigger frame associated with the station.

12. The method of claim 8, wherein the periodic scheduling indicator is located in a Per User Information field of a trigger frame associated with the station.

13. The method of claim 12, wherein the compression indicator is located in the Per User Information field of the trigger frame associated with the station.

14. The method of claim 8, wherein the method comprises:
arranging, by the access point, Per User Info fields of a trigger frame comprising full scheduling information together, followed by Per User Info fields of the trigger frame comprising compressed scheduling information.

15. A station adapted to communicate in a wireless communications system, the station comprising:
a processor; and
a non-transitory computer readable storage medium storing programming for execution by the processor, the programming including instructions to configure the station to:
receive a periodic scheduling indicator, a compression indicator and scheduling information from an access point (AP), wherein the periodic scheduling indicator indicates whether a periodic transmission is scheduled for the station, and wherein the compression indicator indicates whether the scheduling information for the station is compressed scheduling information;
determine full scheduling information in accordance with the periodic scheduling indicator, the compression indicator and the scheduling information; and
transmit a packet in accordance with the full scheduling information to the AP;
wherein the periodic scheduling indicator is located in a first Per User Information field of the trigger frame,
wherein the compression indicator is located in a second Per User Information field of the trigger frame associated with the station,
wherein the scheduling information includes the compressed scheduling information, and wherein determining the full scheduling information comprises:
receiving the compressed scheduling information in the second Per User Information field of the trigger frame associated with the station, and
obtaining the full scheduling information according to stored full scheduling information and the compressed scheduling information.

16. The station of claim 15, wherein the programming including instructions to configure the station to:
store the full scheduling information in the station.

17. An access point adapted to communicate in a wireless communications system, the access point comprising:
a processor; and
a non-transitory computer readable storage medium storing programming for execution by the processor, the programming including instructions to configure the access point to:
transmit a periodic scheduling indicator, a compression indicator and scheduling information, wherein the periodic scheduling indicator indicates whether a periodic transmission is scheduled for a station, and wherein the compression indicator indicates whether the scheduling information for the station is compressed scheduling information, and
receive a packet from a station in accordance with the scheduling information, the periodic scheduling indicator, and the compression indicator;
wherein the periodic scheduling indicator is located in a first Per User Information field of the trigger frame, wherein the compression indicator is located in a second Per User Information field of the trigger frame associated with the station, wherein the scheduling information includes the compressed scheduling information, and wherein determining the full scheduling information comprises:

receiving the compressed scheduling information in the second Per User Information field of the trigger frame associated with the station, and obtaining the full scheduling information according to stored full scheduling information and the compressed scheduling information.

18. The access point of claim 17, wherein the periodic scheduling indicator is located in a Common Information field of a trigger frame, and wherein the compression indicator is located in a Per User Information field of the trigger frame associated with the station.

19. The access point of claim 17, wherein the periodic scheduling indicator and the compression indicator are located in a Per User Information field of a trigger frame associated with the station.

20. The access point of claim 17, wherein the programming including instructions to configure the access point to:

arrange Per User Info fields of a trigger frame comprising full scheduling information together, followed by Per User Info fields of the trigger frame comprising compressed scheduling information.

* * * * *